US011085495B2

(12) United States Patent
Kim et al.

(10) Patent No.: US 11,085,495 B2
(45) Date of Patent: Aug. 10, 2021

(54) DOUBLE CLUTCH ASSEMBLY

(71) Applicants: HYUNDAI MOTOR COMPANY, Seoul (KR); KIA MOTORS CORPORATION, Seoul (KR)

(72) Inventors: Jong Min Kim, Hwaseong-si (KR); Jeong Heon Kam, Seongnam-si (KR); Jinwoo Lee, Gangwon-do (KR); Euihee Jeong, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/798,766

(22) Filed: Feb. 24, 2020

(65) Prior Publication Data
US 2021/0140490 A1    May 13, 2021

(30) Foreign Application Priority Data
Nov. 12, 2019   (KR) .......................... 10-2019-0144558

(51) Int. Cl.
*F16D 13/38*   (2006.01)
*F16D 13/58*   (2006.01)

(52) U.S. Cl.
CPC ......... *F16D 13/585* (2013.01); *F16D 13/385* (2013.01)

(58) Field of Classification Search
CPC ....... F16D 13/385; F16D 13/585; F16D 13/38
See application file for complete search history.

(56) References Cited

U.S. PATENT DOCUMENTS

| | | | | |
|---|---|---|---|---|
| 2002/0144875 | A1* | 10/2002 | Dau | F16D 13/583 192/48.8 |
| 2012/0255826 | A1* | 10/2012 | Tanaka | F16D 21/00 192/48.1 |
| 2015/0204388 | A1* | 7/2015 | Fuenfgeld | F16D 13/46 192/48.8 |
| 2017/0138411 | A1* | 5/2017 | Min | F16D 13/385 |

FOREIGN PATENT DOCUMENTS

KR          10-1558768 B1     10/2015

* cited by examiner

*Primary Examiner* — Huan Le
(74) *Attorney, Agent, or Firm* — Brinks Gilson & Lione

(57) ABSTRACT

A double clutch assembly includes: a center plate, first and second disks, first and second pressure plates, a connecting plate, a cover plate, a pulling cover, first and second diaphragm springs, and a guide plate. In particular, the pulling cover is formed with an engagement recess, an engagement slot is formed at the second diaphragm spring, and the guide plate includes a body, an exterior engagement end protruding toward the second diaphragm spring and inserted into the engagement slot and the engagement recess, an interior engagement end formed at an interior circumference of the body, and a fixing end inserted into an incision slit of the second diaphragm spring.

12 Claims, 5 Drawing Sheets

DOUBLE CLUTCH ASSEMBLY

CROSS-REFERENCE TO RELATED APPLICATION

This application claims priority to and the benefit of Korean Patent Application No. 10-2019-0144558, filed on Nov. 12, 2019, the entire contents of which are incorporated herein by reference.

FIELD

The present disclosure relates to a double clutch assembly.

BACKGROUND

The statements in this section merely provide background information related to the present disclosure and may not constitute prior art.

Environment-friendly technology in vehicles is a core technology of a future automobile industry, and automakers are focusing on developing environment-friendly vehicles to achieve environmental and fuel efficiency regulations.

An electric vehicle (EV) and a hybrid electric vehicle (HEV) that utilize electrical energy, and a double clutch transmission (DCT) improving efficiency and convenience may be examples of future vehicle technologies.

In addition, vehicle manufacturers are trying to commercialize a predetermined technology such as an idle stop and go (ISG) device and a regenerative braking device, as a means for enhancing the efficiency of a driving force transfer system in an effort to enhance the performance of fuel efficiency while meeting exhaust gas regulations of each country.

As part of the efforts of automobile makers to respond to the fuel economy regulations, the number of vehicle models employing the manual transmission structure, which has proven fuel efficiency, is increasing recently.

In the case of a manual transmission, dry clutch components are applied to transmit the power of the engine to the vehicle body, thereby increasing the power delivery efficiency and the reaction speed.

However, it is necessary to operate a clutch pedal, for example, it is necessary to disconnect the power source for shifting. Thus, there is a drawback in driving efficiency since it makes the driver feel a rough shift feel compared to automatic transmission.

Recently, a double clutch transmission (DCT) has been applied to solve the drawback of a manual transmission.

The double-clutch transmission (DCT), which has become a hot topic in recent years, has been applied to a manual transmission structure to cope with fuel consumption regulations, as well as to increase power efficiency and improve convenience.

This double clutch transmission enables only automatic shifting through the double clutch assembly and employed actuators, and provides a shift feel of the automatic transmission level, thereby taking merits of driving comfort of an automatic transmission, power delivery efficiency of a manual transmission, and enhancement of fuel consumption.

However, we have discovered that since the double clutch transmission has a structure based on a manual transmission, it is disadvantageous in terms of starting feeling and NVH compared with an automatic transmission. Thus, overcoming the drawback of the double clutch transmission is a main issue of the double clutch transmission.

The above information disclosed in this Background section is only for enhancement of understanding of the background of the present disclosure and therefore it may contain information that does not form the prior art that is already known to a person of ordinary skill in the art.

SUMMARY

In one form of the present disclosure, a double clutch assembly includes: a center plate, first and second disks disposed at both sides of the center plate, a first pressure plate disposed at a distal side of the first disk, a second pressure plate disposed at a distal side of the second disk, a connecting plate disposed at a distal side of the second pressure plate and configured to receive an engine torque, a cover plate disposed at a distal side of the first pressure plate and fixedly coupled with the center plate, a pulling cover disposed at a distal side of the cover plate and connected with the second pressure plate, a first diaphragm spring disposed between the first pressure plate and the cover plate and configured to introduce an axial direction displacement to the first pressure plate, a second diaphragm spring disposed between the cover plate and the pulling cover and configured to introduce an axial direction displacement of the cover plate, and a guide plate fixedly coupled to the cover plate and configured to guide the second diaphragm spring in an axial direction.

In one form, the pulling cover may be formed in a disc shape and may be formed with a plurality of engagement recesses at an interior circumference portion of the pulling cover. A plurality of engagement slots may be formed along an exterior circumference of the second diaphragm spring. The guide plate may include a body having a ring shape, a plurality of exterior engagement ends formed at an exterior circumference of the body and protruding toward the second diaphragm spring to be inserted into the plurality of engagement slots and the plurality of engagement recesses, a plurality of interior engagement ends formed at an interior circumference of the body, and a plurality of fixing ends each protruding from the interior circumference of the body between adjacent interior engagement ends and inserted into an incision slit of the second diaphragm spring.

The guide plate may further include a protrusion end having a ring shape and configured to: protrude toward the second diaphragm spring and form a contact point with the second diaphragm spring.

The pulling cover may be formed with a second supporting end configured to: protrude toward the second diaphragm spring and support a surface of the second diaphragm spring, thereby forming a second pivot point at which the second diaphragm spring may pivotally operate with respect to the pulling cover.

The plurality of engagement recesses may be formed by a predetermined depth in a radial direction such that the interior circumference portion of the pulling cover may form a curved line.

Each engagement slot of the plurality of engagement slots may be formed as a slot formed in parallel with the exterior circumference of the second diaphragm spring and having an open end to the exterior circumference of the second diaphragm spring.

Each interior engagement end of the plurality of interior engagement ends of the guide plate may be formed with a pin hole to be engaged with the cover plate.

Each fixing end of the plurality of fixing ends may be formed with two wing portions to be fitted to the incision slit of the second diaphragm.

According to an exemplary double clutch assembly, concentricity of the cover plate, the pulling cover, and the second diaphragm spring is secured by the guide plate, and thereby distortion of elements, such as the first and second pressure plates, the pulling cover, and the cover plate, may be inhibited or prevented.

As such, by enabling uniform load over the diaphragm springs, an NVH performance may be enhanced.

Since the second contact point for the second diaphragm spring is formed at the guide plate by forming the protrusion end, rigidity of the second contact point may be increased. By strengthening the rigidity of the contact point for the second diaphragm spring, non-uniform wear in the contact point is inhibited or prevented, and thereby non-uniform wear of the friction disks may be inhibited.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
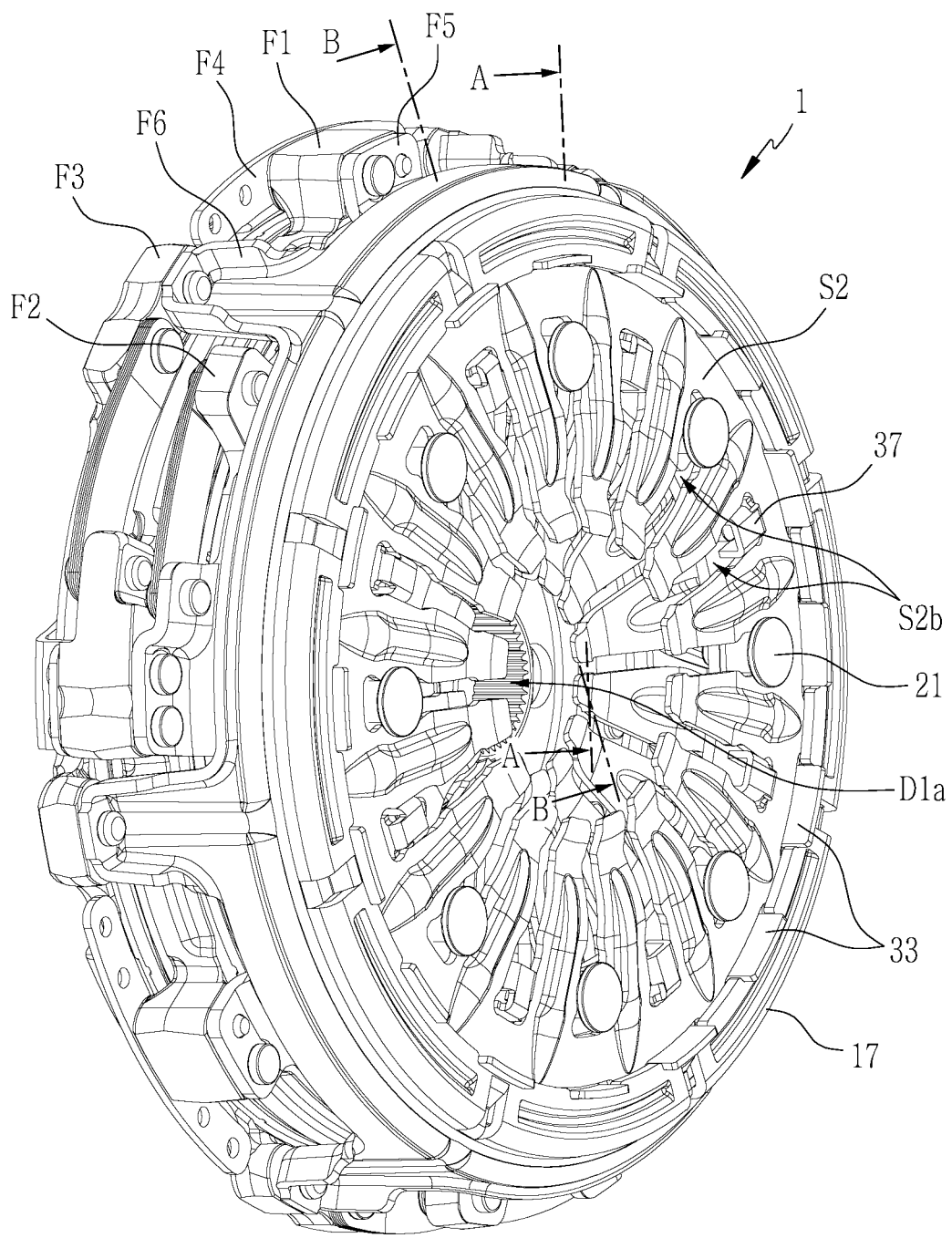
FIG. 1 is a perspective view of a double clutch assembly according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An exemplary form of the present disclosure will hereinafter be described in detail with reference to the accompanying drawings.

In the following description, dividing names of components into first, second and the like is to divide the names because the names of the components are the same as each other and an order thereof is not particularly limited.

Figure 2:
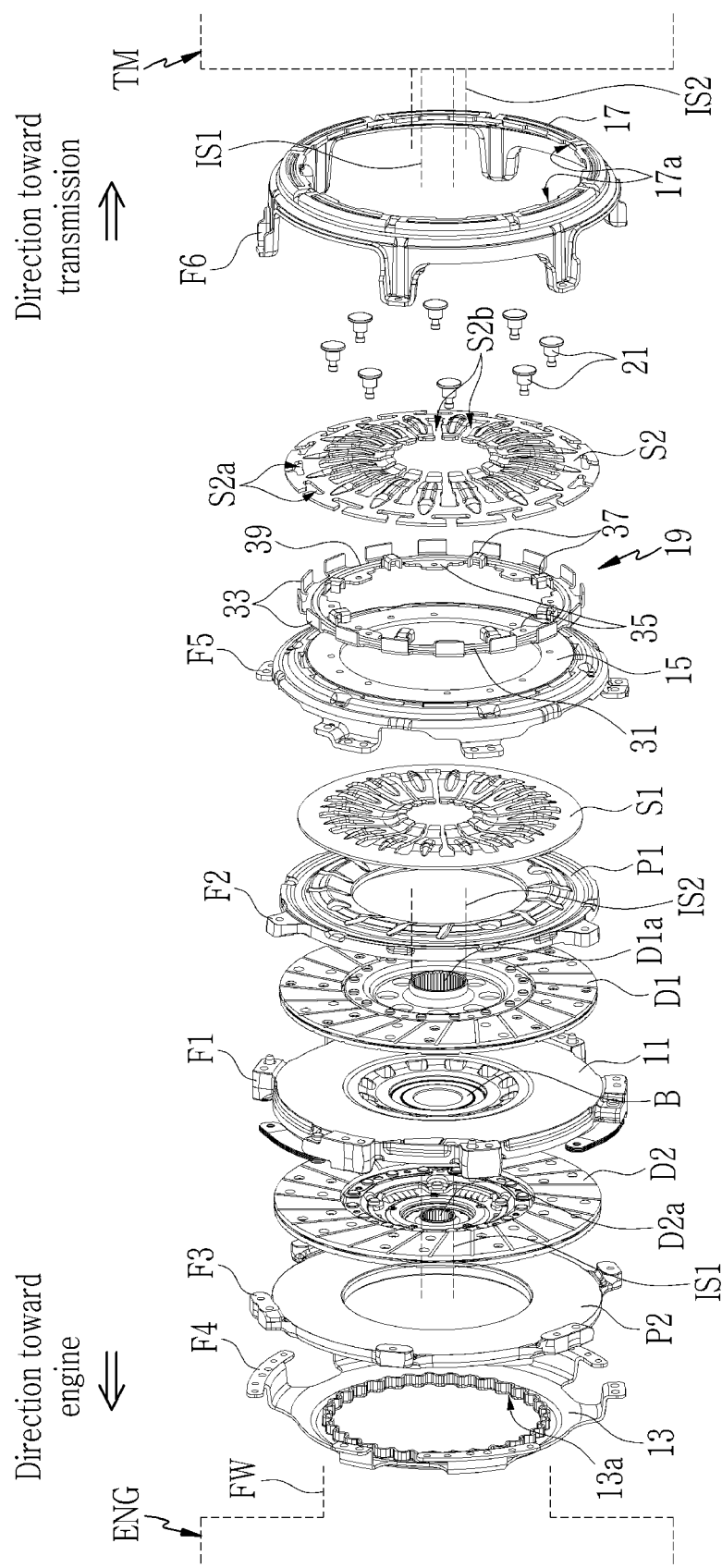
FIG. 2 is an exploded perspective view of a double clutch assembly according to an exemplary form of the present disclosure.

FIG. 1 is a perspective view of a double clutch assembly according to an exemplary form, and FIG. 2 is an exploded perspective view of a double clutch assembly according to an exemplary form.

Referring to FIG. 1 and FIG. 2, a double clutch assembly 1 includes: a center plate 11, first and second disks D1 and D2, first and second pressure plates P1 and P2, a connecting plate 13, a cover plate 15, a pulling cover 17, first and second diaphragm springs S1 and S2, and a guide plate 19.

In the following description, the term "distal side" means to be farther from the center plate 11. Therefore, when an element A is described to be disposed at a distal side of an element B, the element A is disposed farther than the element B with respect to the center plate 11.

The center plate 11 is disposed on a first input shaft IS1, among two coaxial input shafts IS1 and IS2 of the transmission TM via a bearing B, and may relatively rotate with respect to the first input shaft IS1.

The center plate 11 is formed in a disc shape having a central hole such that the center plate 11 may be coaxially disposed with the two input shafts. A first flange portion F1 is formed at an exterior circumference of the center plate 11 to be coupled with the connecting plate 13.

The first disk D1 disposed adjacent to the center plate 11 in a direction toward the transmission TM. An interior circumference portion of the first disk D1 is spline-coupled with the first input shaft IS1, and thereby the first disk D1 integrally rotates with the first input shaft IS1.

The second disk D2 disposed adjacent to the center plate 11 in a direction toward the engine ENG. An interior circumference portion of the second disk D2 is spline-coupled with a second input shaft IS2 of the two coaxial input shafts IS1 and IS2 of the transmission TM, and thereby the second disk D2 integrally rotates with the second input shaft IS2.

The first pressure plate P1 is disposed at a distal side (i.e., a side in the direction toward the transmission TM) of the first disk D1. The second pressure plate P2 is disposed at a distal side (i.e., a side in the direction toward the engine ENG) of the second disk D2.

The first pressure plate P1 is fixedly coupled with the center plate 11 to integrally rotate therewith, and may freely rotate with respect to the first input shaft IS1. The first pressure plate P1 is coaxially disposed with the first input shaft IS1, and is formed in a disc shape having a central hole receiving the first input shaft IS1 without interference. A second flange portion F2 is formed on an exterior circumference of the first pressure plate P1, for the fixed coupling with the first flange portion F1 of the center plate 11.

The second pressure plate P2 is fixedly coupled with the pulling cover 17 to integrally rotate therewith, and may freely rotate with respect to the second input shaft IS2. The second pressure plate P2 is coaxially disposed with the second input shaft IS2, and is formed in a disc shape having a central hole receiving the second input shaft IS2 without interference. A third flange portion F3 is formed on an exterior circumference of the second pressure plate P2, for the fixed coupling with the pulling cover 17.

The connecting plate 13 is disposed at a distal side of the second pressure plate P2, and may form a distal end side of the double clutch assembly. An interior circumference portion of the connecting plate 13 continuously receives an engine torque by being fixedly coupled with a flywheel of the engine ENG, and an exterior circumference portion of the connecting plate 13 is fixedly coupled with the center plate 11 to integrally rotate with the center plate 11.

That is, the connecting plate 13 is directly coupled with an output side of the engine ENG and receives a driving torque from the engine ENG. The connecting plate 13 is formed in a disc shape having a central hole, and a spline portion 13a is uniformly formed on an interior circumference of the central hole for the coupling with the flywheel FW. A fourth flange portion F4 is formed on an exterior circumference of the connecting plate 13, for the fixed coupling with the first flange portion F1 of the center plate 11.

The cover plate 15 disposed adjacent to the first pressure plate P1 at a distal side thereof, i.e., in a direction toward the transmission TM. An exterior circumference portion of the cover plate 15 is fixedly coupled with the center plate 11 in a direction toward the transmission TM, thereby integrally rotating with the center plate 11.

That is, the cover plate 15 is fixedly coupled with the center plate 11, and may rotate with respect to the first input shaft IS1. The cover plate 15 is coaxially disposed with the first input shaft IS1, and is formed in a disc shape having a central hole receiving the first input shaft IS1 without interference. A fifth flange portion F5 is formed on an exterior circumference of the cover plate 15, for the fixed coupling with the first flange portion F1 of the center plate 11.

Here, the first flange portion F1 of the center plate 11 is coupled with the fourth and fifth flange portions F4 and F5 of the connecting plate 13 and the cover plate 15, and thus, the center plate 11 is assembled with the connecting plate 13 and the cover plate 15 such that they may rotate together with the flywheel FW.

The first disk D1 and the first pressure plate P1 are disposed between the center plate 11 and the cover plate 15, and the second disk D2 and the second pressure plate P2 are disposed between the center plate 11 and the connecting plate 13.

The second flange portion F2 of the first pressure plate P1 is connected with a pin disposed between the first and fourth flange portions F1 and F4 of the center plate 11 and the connecting plate 13, and therefore, the first pressure plate P1 is movable along the axial direction but fixed along the rotation direction, to rotate together with the flywheel FW.

The third flange portion F3 of the second pressure plate P2 is connected with a pin disposed between the first and fourth flange portions F1 and F4 of the center plate 11 and the connecting plate 13, and therefore, the second pressure plate P2 is movable along the axial direction but fixed along the rotation direction, to rotate together with the flywheel FW.

In the exemplary double clutch assembly 1, the pulling cover 17, the first and second diaphragm springs S1 and S2, and the guide plate 19 are disposed adjacent to the cover plate 15.

The pulling cover 17 is formed in a generally disc shape, and disposed at a distal side of the cover plate 15, i.e., in a direction toward the transmission TM, and an exterior circumference portion of the pulling cover 17 is connected with the second pressure plate P2.

A plurality of engagement recesses 17a are formed, e.g., in an equal spacing, at an interior circumference portion of the pulling cover 17. The engagement recesses 17a are formed at the interior circumference portion by a predetermined depth in a radial direction, such that the interior circumference portion of the pulling cover 17 may form a curved line.

A flange portion F6 formed at an exterior circumference of the pulling cover 17 is engaged with the third flange portion F3 formed at the exterior circumference of the second pressure plate P2, and thus, pulling cover 17 may integrally move with the second pressure plate P2 in the axial direction.

Since the pulling cover 17 is fixed to the second pressure plate P2, the pulling cover 17 integrally rotates with the flywheel FW.

That is, when the engine ENG is running, the double clutch assembly 1 integrally rotates with the flywheel FW, except the first disk D1 and the second disk D2. For such a purpose, the pulling cover 17 is formed in a disc shape having a central hole to be coaxially disposed with the first input shaft IS1, and the sixth flange portion F6 is formed at the exterior circumference of the pulling cover 17, for the fixed coupling with the third flange portion F3 of the second pressure plate P2.

Figure 3:
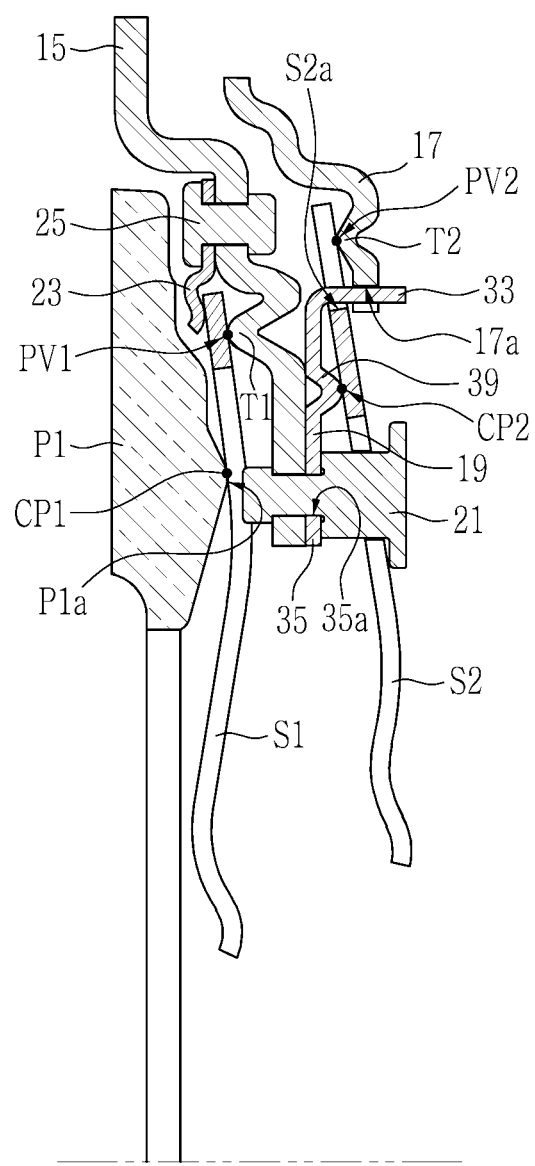
FIG. 3 is a partial cross-sectional view according to line A-A of a double clutch assembly in FIG. 1.
Figure 4:
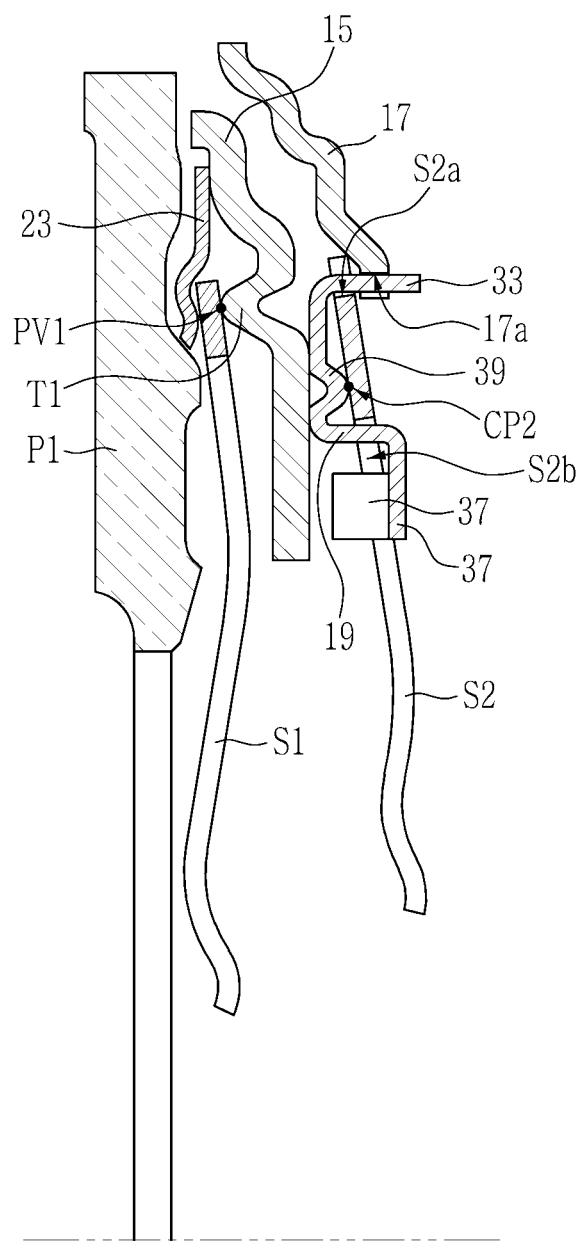
FIG. 4 is a partial cross-sectional view according to line B-B of a double clutch assembly in FIG. 2.

FIG. 3 is a partial cross-sectional view according to line A-A of a double clutch assembly according to an exemplary form, and FIG. 4 is a partial cross-sectional view according to line B-B of a double clutch assembly according to an exemplary form.

Referring to FIG. 2, FIG. 3, and FIG. 4, the first diaphragm spring S1 is disposed between the first pressure plate P1 and the cover plate 15. The first diaphragm spring S1 may push the first pressure plate P1 in the direction toward the engine ENG, e.g., by being pressurized by an actuator (not shown) pushing an interior circumference of the first diaphragm spring S1, and thereby, the first disk D1 may frictionally contact the first pressure plate P1 and the center plate 11.

Then, the torque of the flywheel FW of the engine ENG that is transmitted to the center plate 11 through the connecting plate 13 may be transmitted to the first input shaft IS1 through the first disk D1 frictionally contacting the center plate 11 by the first pressure plate P1, thereby transmitting the torque of the engine ENG to the transmission TM.

The cover plate 15 is formed with a first supporting end T1 protruding at a surface of the cover plate 15 facing the engine ENG, i.e., protruding toward the first diaphragm spring S1. The first supporting end T1 supports a surface of the first diaphragm spring S1 facing the transmission TM. Therefore, the cover plate 15 forms a first pivot point PV1 at which the first diaphragm spring S1 may pivotally operate with respect to the cover plate 15.

A supporting bracket 23 is coupled to the surface of the cover plate 15 facing the engine ENG by an engagement pin 25. An exterior circumference of the first diaphragm spring S1 is supported by the supporting bracket 23.

The first pressure plate P1 is formed with a protrusion surface P1a at a surface of the first pressure plate P1 facing the first diaphragm spring S1, and contacts the first diaphragm spring S1 through the protrusion surface P1a. Thus, the protrusion surface P1a forms a first contact point CP1 for contacting the first diaphragm spring S1.

The second diaphragm spring S2 together with the guide plate 19 are disposed between the cover plate 15 and the pulling cover 17. The second diaphragm spring S2 may push the pulling cover 17 in the direction toward the transmission TM, e.g., by being pressurized by an actuator (not shown) pushing an interior circumference portion of the second diaphragm spring S2, and thereby, the second disk D2 may frictionally contact the second pressure plate P2 and the center plate 11.

Then the torque of the flywheel FW of the engine ENG that is transmitted to the center plate 11 through the connecting plate 13 may be transmitted to the second input shaft IS2 through the second disk D2 frictionally contacting the center plate 11 and the second pressure plate P2, thereby transmitting the torque of the engine ENG to the transmission TM.

Differently from the first diaphragm spring S1, the second diaphragm spring S2 is provided with a plurality of engagement slots S2a are formed along an exterior circumference of the second diaphragm spring S2. Each of the engagement slots S2a is formed as a slot formed in parallel with the exterior circumference of the second diaphragm spring S2 and having an open end to the exterior circumference of the second diaphragm spring S2.

Figure 5:
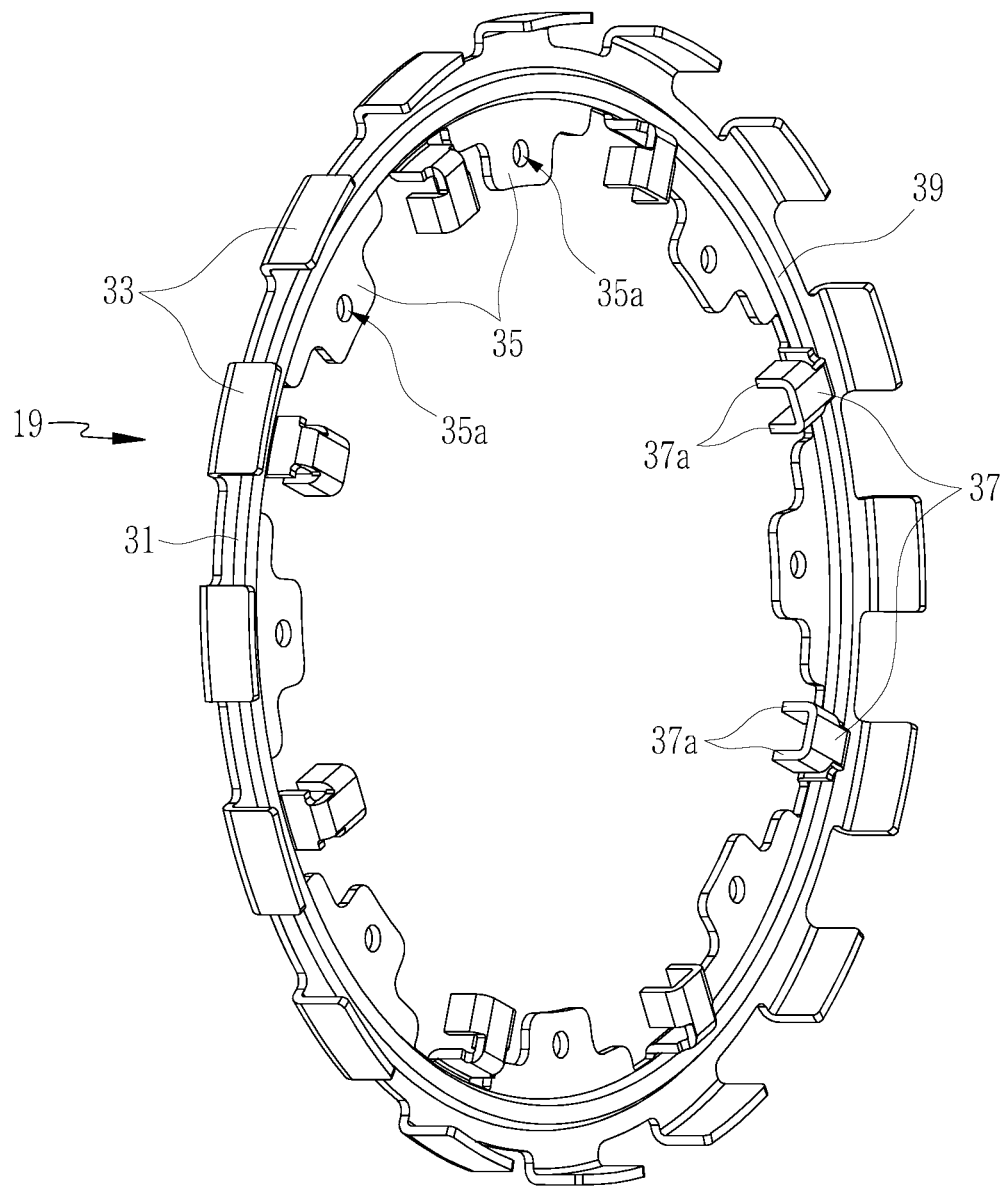
FIG. 5 is a perspective view of a guide plate applied to a double clutch assembly according to an exemplary form of the present disclosure.

FIG. 5 is a perspective view of a guide plate applied to a double clutch assembly according to an exemplary form.

Referring to FIG. 3 to FIG. 5, the guide plate 19 is fixedly coupled to a surface of the cover plate 15 facing the transmission TM by a plurality of engagement pins 21.

The guide plate 19 includes a body 31 of a ring shape, and is formed with a plurality of exterior engagement ends 33 protruding from an exterior circumference of the body 31 in a direction toward the transmission TM, e.g., by an equal spacing.

The exterior engagement end 33 is inserted into the engagement slot S2a of the second diaphragm spring S2 and then inserted into the engagement recess 17a of the pulling cover 17. The exterior engagement end 33 fixes the second diaphragm spring S2 and the pulling cover 17 in the rotation direction, and enhances concentricity.

In addition, a plurality of interior engagement ends 35 are formed at a radially interior circumference of the body 31 of the guide plate 19, e.g., by an equal spacing. A pin hole 35a is formed at each of the interior engagement ends 35, and guide plate 19 is fixed to the cover plate 15 by engagement pins 21 and the pin holes 35a. The engagement pin 21 penetrates the second diaphragm spring S2 through an incision slit S2b formed at the second diaphragm spring S2, and is fixed to the cover plate 15 through the pin hole 35a.

The guide plate 19 is provided with a plurality of fixing ends 37 at the interior circumference of the guide plate 19. Each fixing end 37 is disposed between two adjacent interior engagement ends 35, and protrudes toward the transmission TM. The fixing end 37 is inserted into the incision slit S2b of the second diaphragm spring S2, and thereby, the second diaphragm spring S2 is fixed in the rotation direction with respect to the cover plate 15.

The fixing end 37 is formed with two wing portions 37a bent toward the engine ENG and supported by both walls of the incision slit S2b. By the wing portions 37a, the fixing end is fitted to the incision slit S2b.

In addition, the guide plate 19 is provided with a protrusion end 39 of a ring shape protruding toward the transmission TM, i.e., toward the second diaphragm spring S2. By the protrusion end 39, the guide plate 19 contacts a surface of the second diaphragm spring S2 facing the engine ENG, and thereby forms a second contact point CP2.

The pulling cover 17 is formed with a second supporting end T2 protruding at a surface of the pulling cover 17 facing the engine ENG, i.e., protruding toward the second diaphragm spring S2. The second supporting end T2 supports a surface of the second diaphragm spring S2 facing the transmission TM. Therefore, the pulling cover 17 forms a second pivot point PV2 at which the second diaphragm spring S2 may pivotally operate with respect to the pulling cover 17.

According to a double clutch assembly 1 according to an exemplary form, concentricity of the cover plate 15, the pulling cover 17, and the second diaphragm spring S2 is secured by the guide plate 19, and thereby distortion of elements, such as the first and second pressure plates P1 and P2, the pulling cover 17, and the cover plate 15, may be prevented.

While the double clutch operates, the guide plate 19 secures concentricity of the second diaphragm spring S2, the pulling cover 17, and the cover plate 15, and therefore, load transmission in the axial direction may be uniform over an entire surface of the second diaphragm spring S2, thereby enhancing the NVH characteristics.

In addition, the guide plate 19 also enhances the concentricity of the pulling cover 17 through the exterior engagement end 33, thereby prevention distortion of the pulling cover 17 and the second pressure plate P2 and enhancing the NVH characteristics.

Since the second contact point CP2 for the second diaphragm spring S2 is formed at the guide plate 19 by forming the protrusion end 39, rigidity of the second contact point CP2 may be increased.

It may be understood that the guide plate 19 may be better for a heat treatment for enhancing rigidity than the cover plate 15, since the cover plate 15 is in a typically complex structure for heat treatment.

As such, a double clutch assembly 1 according to an exemplary form improves assembly structure of the guide plate 19, the second diaphragm spring S2, and the pulling cover 17, by which uniformity of torque distribution, structural strength, and NVH characteristics are improved.

In addition, by strengthening the rigidity of the contact point CP2 for the second diaphragm spring S2, non-uniform wear in the contact point CP2 may be prevented, and thereby non-uniform wear of the friction disks may be prevented.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

| | |
|---|---|
| 1: double clutch assembly | 11: center plate |
| D1, D2: first and second disks | |
| P1, P2: first and second pressure plates | |
| 13: connecting plate | 15: cover plate |
| 17: pulling cover | 17a: engagement recess |
| S1, S2: first and second diaphragm springs | |
| S2a: engagement slot | |
| 19: guide plate | 21: engagement pin |
| 31: body | 33: exterior engagement end |
| 35: interior engagement end | 35a: pin hole |
| 37: fixing end | 37a: wing portion |
| 39: protrusion end | |
| T1, T2: first and second supporting ends | |

What is claimed is:

1. A double clutch assembly, comprising:
a center plate;
first and second disks disposed at opposite sides of the center plate, respectively;
a first pressure plate disposed at a distal side of the first disk;
a second pressure plate disposed at a distal side of the second disk;
a connecting plate disposed at a distal side of the second pressure plate and configured to receive an engine torque;
a cover plate disposed at a distal side of the first pressure plate and fixedly coupled with the center plate;
a pulling cover disposed at a distal side of the cover plate and connected with the second pressure plate;

a first diaphragm spring disposed between the first pressure plate and the cover plate and configured to introduce an axial direction displacement to the first pressure plate;
a second diaphragm spring disposed between the cover plate and the pulling cover and configured to introduce an axial direction displacement of the cover plate; and
a guide plate fixedly coupled to the cover plate and configured to guide the second diaphragm spring in an axial direction,
wherein the pulling cover is formed in a disc shape and is formed with a plurality of engagement recesses at an interior circumference portion of the pulling cover,
wherein a plurality of engagement slots are formed along an exterior circumference of the second diaphragm spring, and
wherein the guide plate comprises:
a body having a ring shape;
a plurality of exterior engagement ends formed at an exterior circumference of the body and protruding toward the second diaphragm spring to be inserted into the plurality of engagement slots and the plurality of engagement recesses;
a plurality of interior engagement ends formed at an interior circumference of the body; and
a plurality of fixing ends each protruding from the interior circumference of the body between adjacent interior engagement ends and inserted into an incision slit of the second diaphragm spring.

2. The double clutch assembly of claim 1, wherein the guide plate further comprises a protrusion end having a ring shape and configured to: protrude toward the second diaphragm spring and form a contact point with the second diaphragm spring.

3. The double clutch assembly of claim 1, wherein the pulling cover is formed with a second supporting end configured to: protrude toward the second diaphragm spring and support a surface of the second diaphragm spring, thereby forming a second pivot point at which the second diaphragm spring pivotally operates with respect to the pulling cover.

4. The double clutch assembly of claim 1, wherein the plurality of engagement recesses are formed by a predetermined depth in a radial direction such that the interior circumference portion of the pulling cover is configured to form a curved line.

5. The double clutch assembly of claim 1, wherein each engagement slot of the plurality of engagement slots is formed as a slot formed in parallel with the exterior circumference of the second diaphragm spring and having an open end to the exterior circumference of the second diaphragm spring.

6. The double clutch assembly of claim 1, wherein each interior engagement end of the plurality of interior engagement ends of the guide plate is formed with a pin hole to be engaged with the cover plate.

7. The double clutch assembly of claim 1, wherein each fixing end of the plurality of fixing ends is formed with two wing portions to be fitted to the incision slit of the second diaphragm.

8. A double clutch assembly, comprising:
a center plate;
first and second disks disposed at opposite sides of the center plate, respectively;
first and second pressure plates disposed at distal sides of the first and second disks, respectively;
a connecting plate disposed at a distal side of the second pressure plate and configured to receive an engine torque;
a cover plate disposed at a distal side of the first pressure plate and fixedly coupled with the center plate;
a pulling cover disposed at a distal side of the cover plate and connected with the second pressure plate;
a first diaphragm spring configured to introduce an axial direction displacement to the first pressure plate;
a second diaphragm spring configured to introduce an axial direction displacement to the second pressure plate; and
a guide plate disposed between the cover plate and the second diaphragm spring,
wherein the guide plate comprises:
a body formed in a ring shape;
a plurality of exterior engagement ends formed at an exterior circumference of the body and protruding toward the second diaphragm spring to be inserted into a plurality of engagement slots formed at an exterior circumference of the second diaphragm spring and to be inserted into a plurality of engagement recesses formed at an interior circumference of the pulling cover;
a plurality of interior engagement ends each formed at an interior circumference of the body and having a pin hole to be engaged with the cover plate by an engagement pin;
a plurality of fixing ends each protruding from the interior circumference of the body between adjacent interior engagement ends and inserted into an incision slit of the second diaphragm spring; and
a protrusion end of a ring shape protruding toward the second diaphragm spring and forming a contact point with the second diaphragm spring.

9. The double clutch assembly of claim 8, wherein each fixing end of the plurality of fixing ends comprises two wing portions to be fitted to the incision slit.

10. The double clutch assembly of claim 8, wherein the pulling cover is formed in a disc shape and is formed with a plurality of engagement recesses at an interior circumference portion of the pulling cover by a predetermined depth in a radial direction such that the interior circumference portion of the pulling cover is configured to form a curved line.

11. The double clutch assembly of claim 8, wherein the pulling cover is formed with a second supporting end protruding toward the second diaphragm spring and supporting a surface of the second diaphragm spring, thereby forming a second pivot point at which the second diaphragm spring pivotally operates with respect to the pulling cover.

12. The double clutch assembly of claim 8, wherein each engagement slot of the plurality of engagement slots of the second diaphragm spring is formed as a slot formed in parallel with the exterior circumference of the second diaphragm spring and having an open end to the exterior circumference of the second diaphragm spring.

* * * * *